United States Patent [19]

McConnell

[11] Patent Number: 4,541,183

[45] Date of Patent: Sep. 17, 1985

[54] TRAILER ALIGNMENT APPARATUS

[76] Inventor: Charles K. McConnell, 5909 Bunch St., East Las Vegas, Nev.

[21] Appl. No.: 503,095

[22] Filed: Jun. 10, 1983

[51] Int. Cl.$^4$ .............................................. B60Q 1/26
[52] U.S. Cl. .................................... 33/264; 116/28 R
[58] Field of Search ................ 33/264, 293; 116/28 R

[56] References Cited

U.S. PATENT DOCUMENTS

| | | | |
|---|---|---|---|
| 2,706,462 | 4/1955 | Evans | 116/28 R |
| 2,815,732 | 12/1957 | Majors | 116/28 R |
| 3,159,917 | 12/1964 | Whitehead | 116/28 R X |
| 3,858,966 | 1/1975 | Lowell | 116/28 R X |
| 3,918,746 | 11/1975 | Lehtisaayi | 33/264 |
| 4,054,302 | 10/1977 | Campbell | 33/264 |
| 4,192,526 | 3/1980 | Myers | 33/264 |
| 4,313,264 | 2/1982 | Miller | 33/264 |

Primary Examiner—William D. Martin, Jr.
Attorney, Agent, or Firm—James E. Brunton

[57] ABSTRACT

A device for assisting the driver of a towing vehicle to maneuver the vehicle toward a vehicle to be towed to position the hitch members of the vehicles in precise alignment. The device includes a vertically extending sighting rod carried by an articulating arm assembly mounted on the towed vehicle and a stop member mounted on the towing vehicle. The sighting rod is aligned with the vertical axis of the cooperating hitches and is viewed by the driver during backing with respect to an index marker so that the cooperating hitches can be maneuvered into precise alignment. Additionally, the sighting rod permits the driver to accurately judge the closing distance between the vehicles.

4 Claims, 6 Drawing Figures

TRAILER ALIGNMENT APPARATUS

BACKGROUND OF THE INVENTION

1. Field of the Invention

The present invention relates generally to automotive accessories and more particularly to an apparatus that can be removably mounted on a towed vehicle to assist the driver of the towing vehicle to back the vehicle into precise alignment with the towed vehicle so that the hitches of the vehicles can readily be interconnected.

2. Discussion of the Prior Art

Towing of vehicles such as camping trailers or work trailers by automobiles, trucks and other powered vehicles is common. However, the backing of the towing vehicle, which typically has a connecting hitch such as a ball hitch, into precise aignment with the ball receiving hitch of the type provided on the trailer or other vehicle to be towed, is frequently a difficult and highly frustrating experience. More often than not the towing vehicle ends up in a position wherein the hitch is either out of transverse alignment or out of longitudinal alignment, or both and the hitches on the vehicles cannot be interconnected. Additionally, the inability of the driver of the towing vehicle to accurately judge his closing position with respect to the towed vehicle results in the vehicles colliding and damage being caused to one or both of the vehicles.

In the past, various devices have been suggested to facilitate the alignment of the hitches on the towed and towing vehicles. Frequently two or more vertically extending metal rods or standards are provided with one rod positioned at a predetermined spacing from the ball of the towing vehicle and the other positioned at a predetermined spacing from the hitch of the towed vehicle. These rods are then used by the driver of the towing vehicle to better judge his position relative to the vehicle to be towed. Exemplary of such devices are those disclosed in U.S. Pat. No. 4,169,610 to Paufler, U.S. Pat. No. 3,889,384 to White, U.S. Pat. No. 3,702,029 to Anderson and U.S. Pat. No. 3,015,162 issued to Bohnet. Other types of devices include guide rod arrangements which embody outwardly extending components adapted to be brought into physical engagement as the towing vehicle approaches the towed vehicle. Such a device is shown in Patent No. 3,363,318 to Folkins et al.

While many of the prior art devices are somewhat useful in assisting the interconnection of the hitch members of the towed and towing vehicles, many were quite cumbersome in use, many tended to get in the way during actual interconnection and towing operations, and many were quite complicated, difficult to use and very expensive to manufacture. Others even presented serious safety hazards during the interconnection operations and when the vehicles are traveling on city streets and on high speed highways.

The apparatus of the present invention uniquely overcomes the drawbacks of the prior art devices by providing a simple, single sighting rod apparatus which is carried by the towed vehicle. The apparatus includes novel articulate means for three axis adjustment of the sighting rod with respect to the cooperating hitches. Additionally, the sighting rod is uniquely provided with first and second adjustable sighting elements, or markers. The first adjustable marker which enables the height of the hitch on the towed vehicle to be precisely set. The second adjustable marker is used in cooperation with a fixed reference marker on the towing vehicle to enable the driver to maneuver the vehicle so that the cooperating hitches move into precise transverse and longitudinal mating alignment. When not in use the articulate means can readily be swung out of the way and the sighting rod removed and conveniently stowed.

The simplicity of the apparatus of the invention and its advantages over the prior art devices will become readily apparent from the discussion which follows.

SUMMARY OF THE INVENTION

It is an object of the present invention to provide a simple and easy to use apparatus for assisting the driver of a towing vehicle to maneuver the towing vehicle toward a vehicle to be towed so as to position the cooperating hitch members of the vehicles in precise transverse and longitudinal alignment.

More particularly it is an object of the invention to provide such an apparatus in which a single sighting rod, or column, having adjustable marker elements is mounted on the towed vehicle, and during maneuvering is viewed by the driver in relation to a fixed reference provided on the towing vehicle.

It is another object of the invention to provide an aignment apparatus of the character described in which the sighting rod is removably carried by an assemblage of pivotally interconnected arm-like members which can be articulated in a manner as to adjust the sighting rod within a three dimensional matrix so as to position it in a precisely vertical orientation and in exact alignment with the central vertical axis of the hitch ball on the towing vehicle.

It is a further object of the invention to provide an alignment apparatus of the aforementioned character in which the sighting rod and cooperating adjustable markers can also be used to correctly adjust the height of the hitch on the towed vehicle with respect to the height of the hitch on the towing vehicle.

It is another object of the invention to provide an apparatus as described in the preceding paragraphs in which the assemblage which supports the sighting rod can readily be swung out of the way when not in use.

Another object is to provide an apparatus of the character described which includes an upstanding stop bracket adapted to be mounted on the towing vehicle proximate the hitch ball for engagement by the ball receiving hitch of the towed vehicle when the respective hitches are in precise longitudinal alignment.

Still another object of the invention is to provide an apparatus of the class described which is simple, easy to set up, inexpensive to manufacture and highly reliable in use.

DESCRIPTION OF ONE FORM OF THE INVENTION

Figure 1:
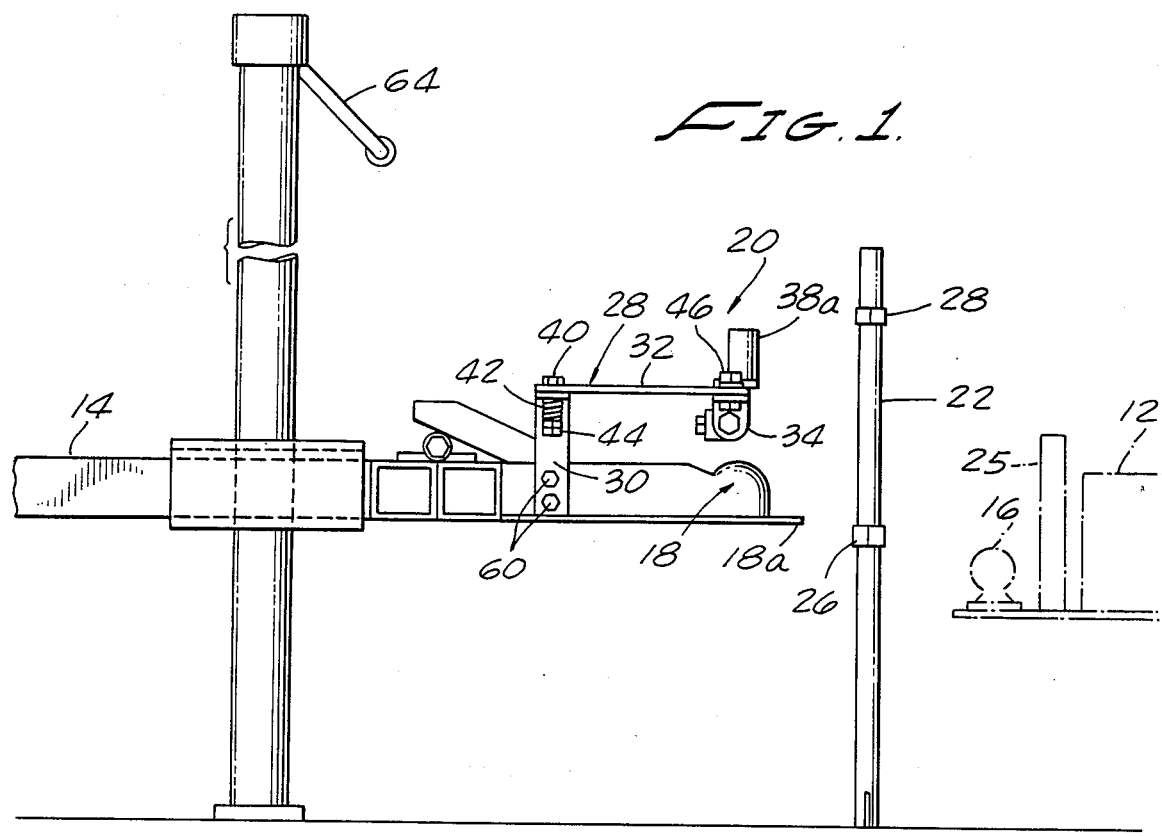
FIG. 1 is a side elevational view of the apparatus of the invention showing the sighting rod of the apparatus being used to adjust the height of the hitch on the towed vehicle with respect to the height of the hitch receiving ball on the towing vehicle.
Figure 2:
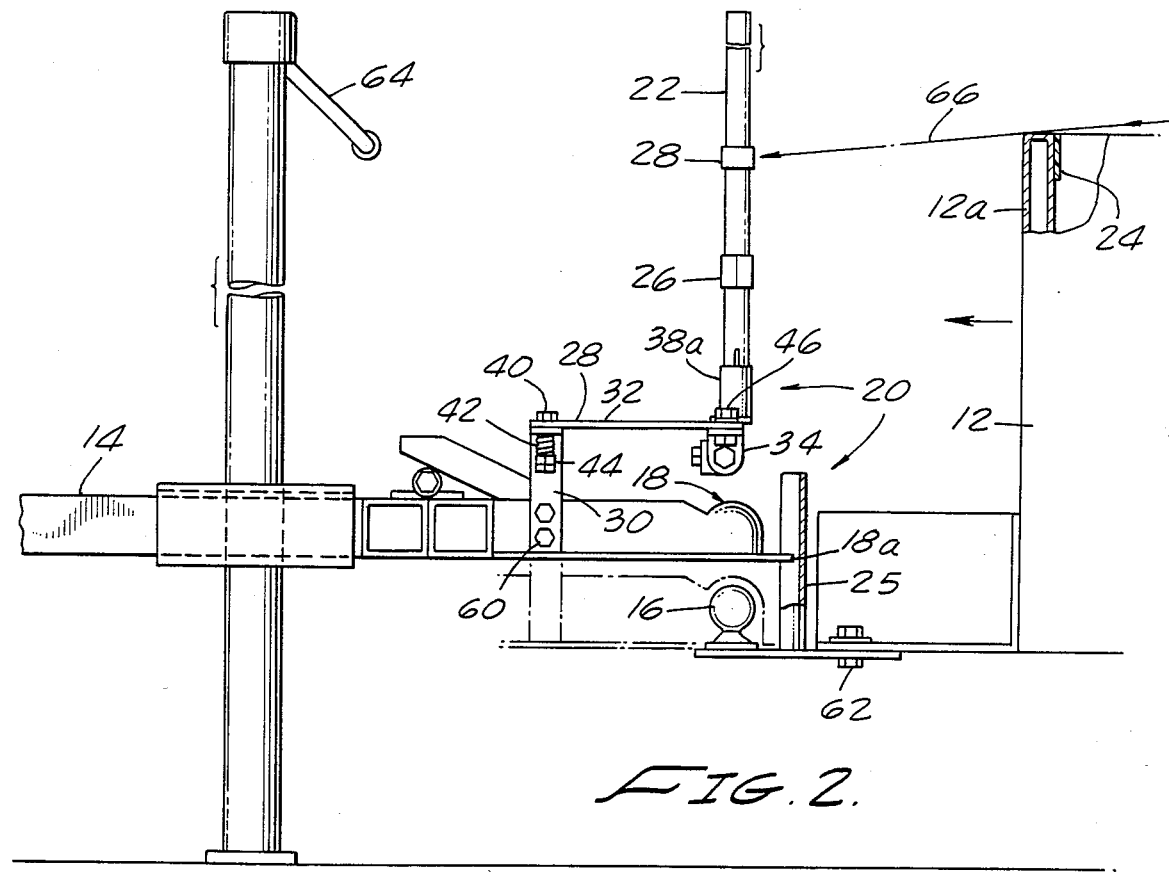
FIG. 2 is a side elevational view of the apparatus of the invention after the towing vehicle has been moved toward the towed vehicle so as to align the hitches on the two vehicles. The arrows shown in this figure represent the line of sight of the driver and illustrate the alignment of the index marker located on the tailgate of the towing vehicle with one of the slidable indexing members provided on the sighting rod.

Referring to the drawings, and particularly to FIGS. 1 and 2, the alignment device of the invention is shown being used in connection with a towing vehicle 12, in this case a pickup truck, and a towed vehicle 14 The towing vehicle 12 is provided with a ball type hitch member 16 and the towed vehicle 14 is provided with a cooperating, interlocking hitch member 18. In the embodiment of the invention hereshown, the alignment device generally designated by the numeral 20, comprises a vertically extending sighting standard 22, support means carried by the towed vehicle for adjustably supporting the sighting standard 22, and for adjusting it relative to the hitch 18, reference means, or reference marker 24 (FIG. 2) affixed to the inside of the tailgate of the towing vehicle and stop means 25 carried by the towing vehicle proximate the hitch member 16 thereof. Also forming a part of the alignment device of this embodiment of the invention are first and second marker means, provided herein the form of market elements, or slidable bands 26 and 28 carried by standard 22. In a manner presently to be described, marker element 26 is used in positioning the height of the hitch member of the towed vehicle relative to the height of the hitch member of the towing vehicle while marker element 28 is used in cooperation with reference marker 24 during backing to permit alignment of the vehicle hitch members and to gauge the closing distance of the towing vehicle with respect to the towed vehicle.

Figure 3:
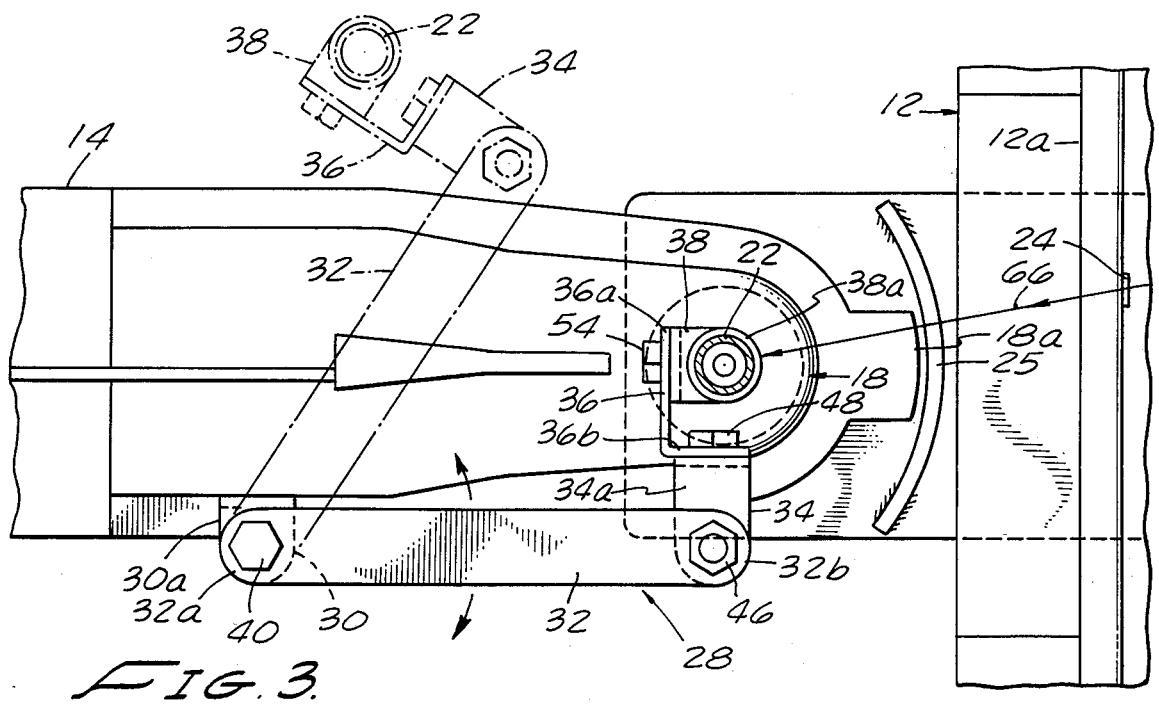
FIG. 3 is a plan view of the apparatus of the invention illustrating in the phantom lines the manner in which the articulating arm assembly of the apparatus may be swung out of the way when not in use.
Figures 4, 5:
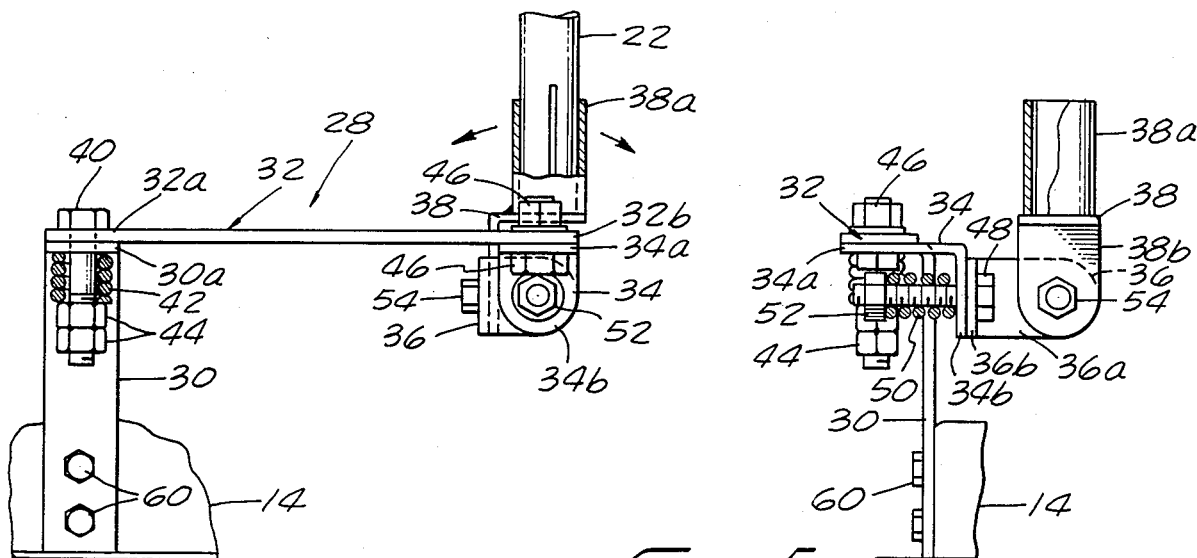
FIG. 4 is a fragmentary side elevational view of the articulating arm assembly of the apparatus illustrating the adjustability of the sighting rod rearwardly and forwardly with respect to the towing vehicle.
FIG. 5 is a fragmentary end view of the arm assembly shown in FIG. 4.
Figure 6:
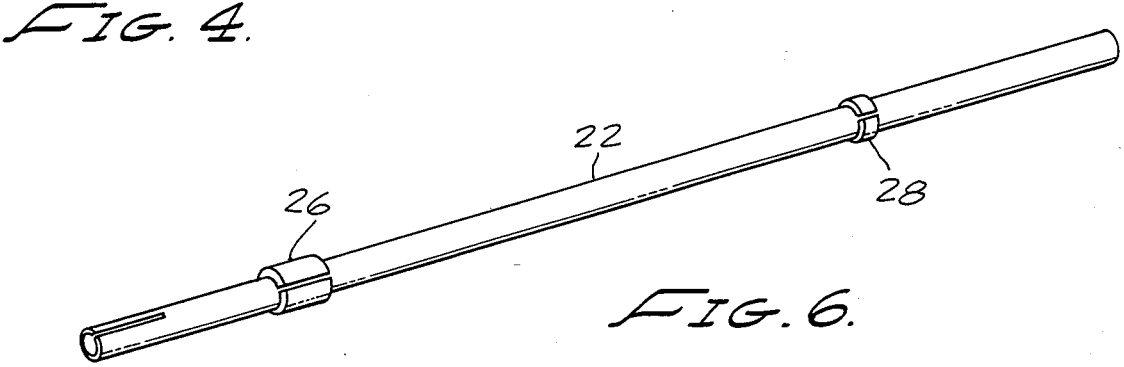
FIG. 6 is a generally perspective view illustrating the construction of the sighting rod portion of the apparatus.

The support means of the invention includes articulate means, generally designated by the numeral 28, for tilting the sighting standard 22 forwardly and rearwardly and from side to side relative to a generally vertically extending axis. The articulate means also permits the sighting standard 22 to be moved arcuately relative to the hitch 18 in the manner shown by the arrows in FIG. 3. Turning to FIGS. 3, 4 and 5, the articulate means comprises a first generally vertically extending member 30 (FIG. 4) adapted to be removably affixed to the towed vehicle proximate the hitch member thereof, a second generally horizontally extending member 32 pivotally connected to member 30, a third generally "L" shaped member 34 pivotally connected to member 32 and a fourth generally "L" shaped member 36 pivotally connected to member 34 (FIG. 3). "L" shaped members 34 and 36 have perpendicularly extending leg portions 34a and 34b and 36a and 36b respectively. As best seen in FIG. 5, a holding member 38 is pivotally connected to leg portion 36a of fourth member 36 for removably carrying the sighting standard 22 (FIG. 4).

Horizontally extending member 32 has first and second ends 32a and 32b. Member 32 is pivotally connected proximate end 32a to a horizontally extending upper leg portion 30a of member 30. An elongated connector, such as bolt 40 is used to pivotally interconnect members 30 and 32 so that member 32 can be pivoted relative to member 30 against a predetermined frictional resistance. A spring member 42 is provided intermediate portion 30a of member 30 and a pair of nuts 44 threadably received on the shank of fastener or bolt 40. By tightening or loosening nuts 44, the tension on spring 42 can be adjusted thereby regulating the frictional resistance to movement of member 32 relative to member 30.

"L" shaped member 34 is interconnected with member 32 proximate the second end 32b thereof, by means of an appropriate fastener such as bolt 46. Similarly, "L" shaped member 36 is pivotally interconnected with "L" shaped member 34 by means of an enlongated connector such as bolt 48 (FIG. 5). Once again, a spring 50 is disposed intermediate leg 34b of member 34 and a nut 52 is threadably received on the shank portion of bolt 48.

By tightening or loosening nut 52, the tension on spring 50 can be adjusted thereby regulating the frictional resistance to movement of member 34 relative to member 36.

As best seen in FIG. 5 holding member 38 includes a generally cylindrically shaped cup-like portion 38a adapted to closely receive the lower end of sighting rod 22 and a depending planar portion 38b which is connected to portion 36a of member 36 by a connector such as belt 54.

An important aspect of the present invention is the several degrees of adjustment of the sighting rod provided by the articulate means. For example, as indicated in FIG. 3, member 32 can be arcuately moved within a horizontally extending plane relative to member 30 about the axis of bolt 40. Similarly, as shown by the arrows in FIG. 4, rod 22 can be moved forwardly and rearwardly within a vertically extending first plane by pivoting member 36 relative to member 34 about the axis of bolt 48. Further, rod 22 can be moved from side to side within a vertically extending second plane perpendicular to said first plane by pivoting member 38 relative to member 36 about the axis of bolt 54. As will be discussed in the paragraphs which follow these several degrees of possible adjustment permits the sighting rod to be precisely adjusted relative to the cooperating hitches provided on the towed and towing vehicle.

Operation

In initially setting up the apparatus of the invention for use, articulating arm assembly 28 is connected to the hitch member 18 of the towed vehicle in the orientation shown in FIG. 1 by connectors 60 and the stop means of the invention 25 is connected to the towing vehicle as shown in FIG. 2 by means of connectors 62. With the articulating assembly swung out of the way as indicated by the phantom lines in FIG. 3, initial alignment of the apparatus can commence. First, the towing vehicle is backed into juxtaposition with the towed vehicle so that the vehicles are positioned generally as shown in FIG. 1. The bottom of the sighting standard 22 then is placed on the ground and band 26 is adjusted up or down so that the lower edge of the band is in alignment with the top of the ball-type hitch member 16 provided on the towing vehicle. Next, using the crank mechanism 64 (FIG. 1), the hitch member 18 of the vehicle to be towed is raised until the bottom of the hitch member 18 is in alignment with the top edge of the band 26. With this height adjustment the hitch member 16 of the towing vehicle can freely pass beneath the hinge member 18 of the towed vehicle.

The sighting standard 22 is next inserted into the holding member 38 so that the bottom portion thereof is telescopically received within portion 38a of the holding member. With the assistance of another person, the towing vehicle is then backed relative to the towed vehicle into the position shown in FIG. 2. In this position the ball receiving hitch 18 of the towed vehicle is directly over, and in precise alignment with, the ball hitch 16 provided on the towing vehicle. In this configuration it is to be noted that the forward extremity 18a of the tongue portion of the hitch member 18 is almost in contact with the upstanding curved portion of the stop means 25.

The hitch members of the vehicles having been thusly positioned in correct alignment, member 32 of the articulating arm assembly is swung from the position shown in the phantom lines in FIG. 3 into the position shown in FIG. 2 wherein the center vertical axis of the ball hitch 16, the ball receiving hitch 18 and the sighting rod 22 are all in alignment. It is to be noted that in this initial aligning step, the sighting rod 22 may be tilted forwardly or rearwardly and to one side or the other in order to position it in precise, true vertical alignment with respect to an imaginary vertical line extending through the precise center of the cooperating hitch members 16 and 18. Of course, once the articulate means is articulated into this correct position, further adjustment is not necessary for subsequent interconnection of the towed and towing vehicles.

The sighting rod 22 having been correctly vertically aligned as shown in FIG. 2, the driver of the towing vehicle next positions himself in a the driver's seat of the vehicle and, looking in the rear view mirror, sights along a line 66 which intersects the top of the vehicle tailgate and the vertically extending sighting rod 22. An assistant then slidably moves reference band 28 upwardly or downwardly so that it appears to the driver to be in precise alignment with the top of the tailgate 12a of the towing vehicle 12. Next, the reference means, or marker 24, is affixed to the inside of the tailgate in alignment with the line of sight (arrow 66 in FIG. 2-see also arrow 66 in FIG. 3 further illustrating the alignment of the reference member 24 with the sighting rods 22 along the line of sight 66).

In those instances in which the towing vehicle is an automobile rather than a pick-up truck, the reference element 24 can be conveniently positioned on the rear window of the vehicle in alignment with the line of sight 66 of the driver viewing the sighting rod 22 and the band 28 through his rear view mirror. While the element 24 may take various forms, an adhesive backed, brightly colored element has proven quite satisfactory for most applications.

With the device of the invention arranged and adjusted in the manner described and as illustrated in FIG. 2, the hitch of the towed vehicle 18 is in precisely the correct position with respect to the hitch of the towing vehicle 16 so that upon lowering of the hitch 18 it will readily mate with hitch member 16 of the towing vehicle. This being the case, when it is necessary in the future to interconnect the towing and towed vehicles, the condition shown in FIG. 2 must simply be reproduced and the correct alignment of the hitch members will automatically be achieved. Of course, when the articulating means of the invention is not in use, it may be conveniently swung out of the way as indicated by the phantom lines in FIG. 3, and the sighting rod 22 may be conveniently stowed within the truck cab or the trunk of the towing automobile.

The advantages of the apparatus of the present invention are several fold. In the first place, once the apparatus is initially set up as described herein, by simply looking in the rear view mirror, the driver can maneuver the towing vehicle relative to the towed vehicle to reproduce the initial set-up position as shown in FIG. 2. As the driver backs the towing vehicle toward the towed vehicle, the overall length of the sighting rod 22 will appear to foreshorten, positively indicating to the driver that he is approaching the correct interconnection point. When the band 28 on the sighting rod 22 appears to move into precise horizontal alignment with the top of the tailgate, or with the sighting element 24 affixed to the rear window of the towing automobile, the driver will known that the hitches 16 and 18 are in correct transverse and longitudinal alignment. However, should the driver misjudge slightly, the stop means 25 will engage the tongue of the hitch on the towing vehicle so as to stop rearward movement of the towing vehicle thereby avoiding damage to the vehicle and at the same time correctly positioning the hitch members longitudinally of one another.

Assembly 28 and stop 25 can be constructed to steel, aluminum or any other rigid material. Rod 22 can conveniently be constructed of plastic pipe or the like and elements 26 and 28 can be formed by fitting small lengths of plastic pipe and slitting them so that they will slide over the sighting rod.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An alignment device for assisting the driver of a towing vehicle to maneuver the towing vehicle toward a vehicle to be towed to position the hitch member of the towing vehicle in precise alignment with the hitch member of the towed vehicle, comprising:
   (a) a vertically extending sighting standard;
   (b) support means carried by the towed vehicle for supporting said sighting standard, said support means including articulate means for movement of said sighting standard relative to the hitch member of the towed vehicle to precisely align said sighting standard with the vertical centerline of said hitch member of the towed vehicle; said articulate means comprising:
      (i) a first generally vertically extending member adapted to be releasably carried by the towed vehicle proximate the hitch member thereof;
      (ii) a second generally horizontally extending member having first and second ends said member being pivotally connected at a first end to said first member;
      (iii) a third generally "L" shaped member having first and second perpendicularly extending legs, said first leg being pivotally connected to said second end of said second member;

(iv) a fourth generally "L" shaped member having first and second perpendicularly extending legs, said first leg being pivotally connected to said second leg of said third member; and (v) a holding member for removably carrying said sighting standard, said holding member being pivotally connected to said second leg of said fourth member; and (c) reference means carried by the towing vehicle for use by the driver of the towing vehicle during backing as a point of reference relative to said sighting standard.

2. An alignment device as defined in claim 1 in which said sighting standard comprises an elongated generally cylindrically shaped member and in which said holding member includes a generally cylindrically shaped portion adapted to slidably receive one end of said elongated generally cylindrically shaped member.

3. An alignment device for assisting the driver of a towing vehicle to maneuver the towing vehicle toward a vehicle to be towed to position the ball type hitch member of the towing vehicle in precise alignment with the ball type hitch member of the towed vehicle, comprising:

(a) a sighting standard;

(b) support means carried by the towed vehicle for supporting said sighting standard, and for adjustably locating said standard relative to the ball receiving hitch member of the towed vehicle, said means including articulate means:

(1) for tilting said sighting standard forwardly and rearwardly relative to said hitch member of the towed vehicle through an arc disposed within a substantially vertically extending first plane passing through the center of said hitch member; and (2) for tilting said sighting standard from side to side relative to said hitch member of the towed vehicle along an arc passing through a vertical line extending through the center of said ball receiving hitch member of the towed vehicle;

(c) said articulate means comprising:

(1) a first generally vertically extending member adapted to be releasably carried by the towed vehicle proximate the hitch member thereof;

(2) a second generally horizontally extending member having first and second ends said member being pivotally connected at a first end to said first member;

(3) a third generally "L" shaped member having first and second perpendicularly extending legs, said first leg being pivotally connected to said second end of said second member;

(4) a fourth generally "L" shaped member having first and second perpendicularly extending legs, said first leg being pivotally connected to said second leg of said third member; and (5) a holding member for removably carrying said sighting standard, said holding member being pivotally connected to said second leg of said fourth member; and (d) reference means carried by the towing vehicle for use by the driver of the towing vehicle during backing as a point of reference relative to said sighting standard.

4. An alignment device as defined in claim 3 in which said articulate means permits tilting movement of said sighting standard relative to said hitch member forwardly and rearwardly along an arc disposed within a substantially vertical second plane perpendicularly disposed to said first plane.

* * * * *